(12) United States Patent
Noguchi et al.

(10) Patent No.: US 12,629,764 B2
(45) Date of Patent: May 19, 2026

(54) DIRECT CURRENT ARC WELDING CONTROL METHOD

(71) Applicant: Panasonic Intellectual Property Management Co., Ltd., Osaka (JP)

(72) Inventors: Takahiro Noguchi, Osaka (JP); Akira Nakagawa, Osaka (JP); Junji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 833 days.

(21) Appl. No.: 17/968,008

(22) Filed: Oct. 18, 2022

(65) Prior Publication Data

US 2023/0041907 A1 Feb. 9, 2023

Related U.S. Application Data

(63) Continuation of application No. PCT/JP2021/017055, filed on Apr. 28, 2021.

(30) Foreign Application Priority Data

May 19, 2020 (JP) ................................. 2020-087627

(51) Int. Cl.
B23K 9/09 (2006.01)
B23K 9/10 (2006.01)
B23K 9/173 (2006.01)

(52) U.S. Cl.
CPC ............ B23K 9/092 (2013.01); B23K 9/1043 (2013.01); B23K 9/173 (2013.01)

(58) Field of Classification Search
CPC ........ B23K 9/073; B23K 9/092; B23K 9/173; B23K 9/1043; B23K 9/23; B23K 9/0953; B23K 9/0956
See application file for complete search history.

(56) References Cited

U.S. PATENT DOCUMENTS 8,373,093 B2 2/2013 Peters
2006/0138115 A1* 6/2006 Norrish .................. B23K 9/091
219/137.71

(Continued)

FOREIGN PATENT DOCUMENTS

CN 102794549 1/2016
CN 108883486 11/2018

(Continued)

OTHER PUBLICATIONS

International Search Report issued Jul. 20, 2021 in International Application No. PCT/JP2021/017055.

(Continued)

*Primary Examiner* — Brian W Jennison
(74) *Attorney, Agent, or Firm* — Wenderoth, Lind & Ponack, L.L.P.

(57) ABSTRACT

DC arc welding is performed by alternating a short-circuit period and an arc period. The arc period includes first to fourth periods. A welding current is raised to a first current value in the first period, lowered to a second current value with a time slope in the second period, kept at the second current value in the third period, and raised to a third current value then kept at the value in the fourth period. A wire feeding speed is constant throughout the short-circuit period and the arc period. In the second period, a welding output is under constant voltage control. In the third period and the fourth period, the welding output is under constant current control of the welding output.

10 Claims, 2 Drawing Sheets

(56) References Cited

U.S. PATENT DOCUMENTS

| | | | |
|---|---|---|---|
| 2006/0283847 A1 | 12/2006 | Kawamoto et al. | |
| 2009/0242533 A1 | 10/2009 | Yamazaki et al. | |
| 2012/0255940 A1* | 10/2012 | Fujiwara | B23K 9/1012 |
| | | | 219/136 |
| 2013/0068744 A1* | 3/2013 | Matsui | B23K 9/0953 |
| | | | 219/137 R |
| 2019/0084068 A1* | 3/2019 | Furuyama | B23K 9/073 |
| 2021/0031293 A1* | 2/2021 | Furuyama | B23K 9/125 |

FOREIGN PATENT DOCUMENTS

| | | |
|---|---|---|
| JP | 10-109163 | 4/1998 |
| JP | 2000-79479 | 3/2000 |
| JP | 2006-21227 | 1/2006 |
| JP | 2009-233728 | 10/2009 |
| JP | 2014-226709 | 12/2014 |
| JP | 2015-16482 | 1/2015 |
| WO | 2012/164833 | 12/2012 |
| WO | 2019/203162 | 10/2019 |

OTHER PUBLICATIONS

Extended European Search Report issued Oct. 16, 2023 in corresponding European Patent Application No. 21809376.3.
Office Action dated Jan. 14, 2026 in Indian Patent Application No. 202247063392, with English Translation.

* cited by examiner

DIRECT CURRENT ARC WELDING CONTROL METHOD

CROSS-REFERENCE TO RELATED APPLICATIONS

This is a continuation of International Application No. PCT/JP2021/17055 filed on Apr. 28, 2021 which claims priority to Japanese Patent Application No. 2020-087627 filed on May 19, 2020. The entire disclosures of these applications are incorporated by reference herein.

BACKGROUND

The present disclosure relates to a direct current (DC) arc welding control method.

Known are arc welding techniques including welding, by alternating a short-circuit period and an arc period, a base material with a welding wire fed at a predetermined feeding speed. In this case, the arc welding is performed while spraying a shielding gas to a welding point.

A widely known arc welding technique is a method of performing the welding by applying on the welding wire a peak current having a greater current value in an initial period of the arc period, so as to reduce occurrence of a short-circuit between the welding wire and the base material, thereby reducing spatters (see, e.g., Japanese Unexamined Patent Publication No. H10-109163 and Japanese Unexamined Patent Publication No. 2006-021227).

SUMMARY

In a case where the shielding gas used is a mixed gas containing an inert gas such as argon (Ar) gas as a main component thereof and carbon dioxide gas, detachability of a droplet formed at a tip of the welding wire is improved.

However, if the typical method disclosed in Japanese Unexamined Patent Publication No. H10-109163 and Japanese Unexamined Patent Publication No. 2006-021227 employ the mixed gas to perform the arc welding, the droplets are detached from the welding wire at irregular timings during the application of the peak current, which disrupts the periodicity of the detaching. Accordingly, the arc becomes unstable and a minute short-circuit tends to occur between the welding wire and the base material. As a result, spatters may occur, which would degrade the appearance of weld beads formed on the base material or cause welding defects.

The present disclosure was made in view of the foregoing. It is an object of the present disclosure to provide a DC arc welding control method that stabilizes the detaching timings at which the droplets are detached, thereby facilitating reduction of the spattering.

In order to achieve the object described above, a direct current (DC) arc welding control method of welding by alternating a short-circuit period and an arc period, wherein the arc period includes at least a first period, a second period, a third period, and a fourth period, the DC arc welding control method includes at least: in the first period, raising a welding current flowing through a welding wire to a first current value; in the second period, lowering the welding current from the first current value to a second current value with a predetermined time slope; in the third period, keeping the welding current at the second current value; and in the fourth period, raising the welding current from the second current value to a third current value lower than the first current value but higher than the second current value, and then keeping the welding current at the third current value until the fourth period ends; the welding wire is fed at a feeding speed constant throughout the short-circuit period and the arc period, in the second period, a welding output is under constant voltage control, and at least in the third period and the fourth period, the welding output is under constant current control.

According to the present disclosure, the detaching timings of droplets are stabilized, thereby facilitating reduction of spattering.

DETAILED DESCRIPTION

An embodiment will now be described in detail with reference to the drawings. The following description of an advantageous embodiment is a mere example in nature, and is not at all intended to limit the scope, applications, or use of the present disclosure.

[Configuration of Arc Welding Apparatus]

Figure 1:
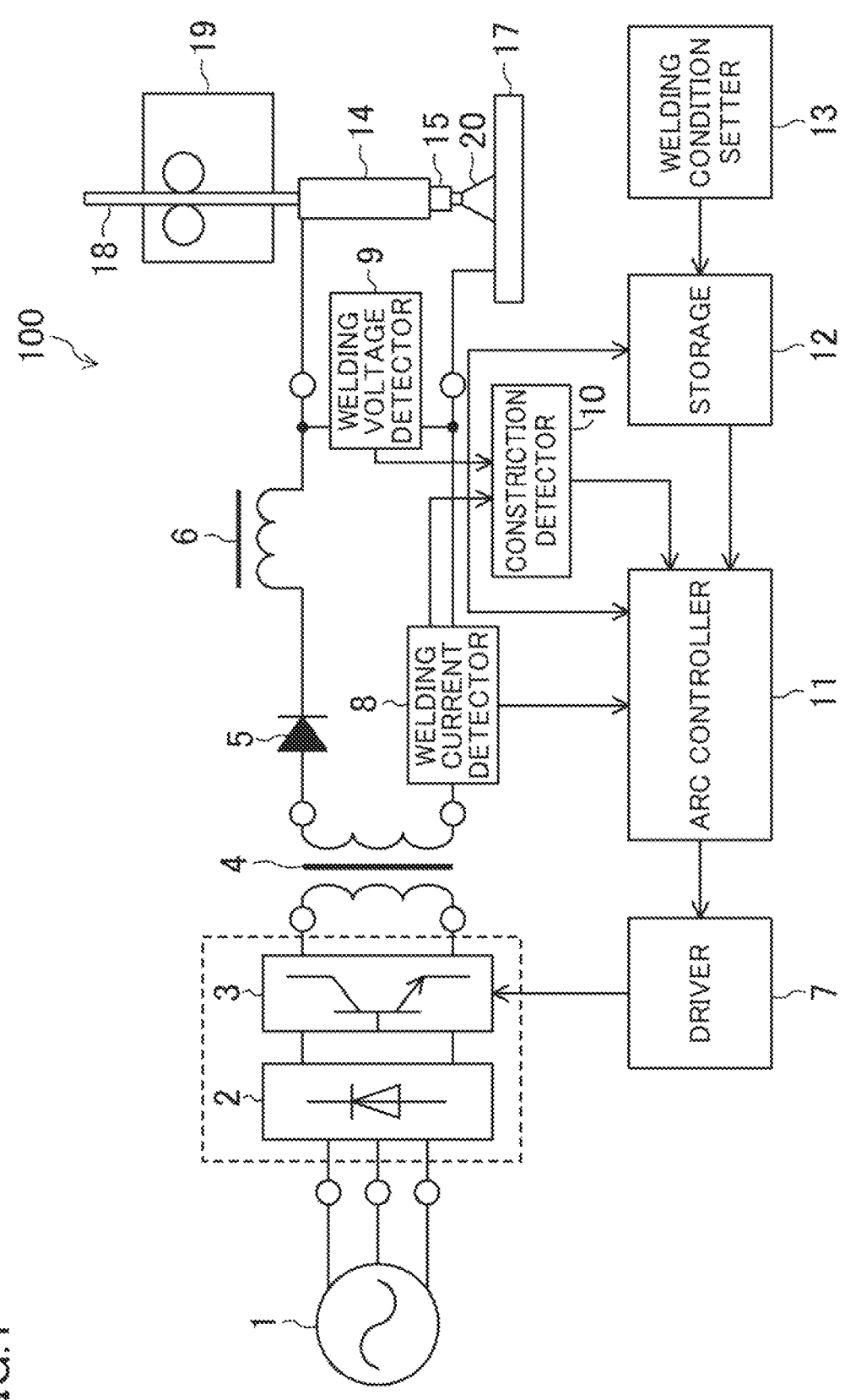
FIG. 1 shows a schematic configuration of an arc welding apparatus according to an embodiment of the present disclosure.

FIG. 1 is a schematic configuration diagram of an arc welding apparatus of this embodiment. An arc welding apparatus 100 includes a primary rectifier 2, a switch 3, and a transformer 4. The primary rectifier 2 rectifies an AC power input from an input power source 1. The switch 3 is configured to control a welding output. The transformer 4 is configured to receive an output of the switch 3 and convert the output into an electric power suitable for welding. The arc welding apparatus 100 of this embodiment is a semi-automatic welding apparatus for welding, which is performed by an operator with a torch 14 in hand.

The arc welding apparatus 100 further includes a secondary rectifier 5, a reactor 6, a driver 7, a welding current detector 8, a welding voltage detector 9, and a constriction detector 10. The secondary rectifier 5 is configured to rectify an output from the secondary side of the transformer 4. The reactor 6 is configured to smoothen an output of the secondary rectifier 5. The driver 7 is configured to drive the switch 3. The welding current detector 8 is configured to perform detection for a welding current. The welding voltage detector 9 is configured to perform detection for a welding voltage. The constriction detector 10 is configured to detect, based on outputs of the welding current detector 8 and the welding voltage detector 9, that a droplet 21 (see FIG. 2) formed at the tip of a welding wire 18 has constricted.

The arc welding apparatus 100 further includes a welding condition setter 13 and a storage 12. The welding condition setter 13 sets welding conditions, such as a set current, a set voltage, the feeding rate of a wire, the type of a shielding gas, the type of the wire, and the diameter of the wire.

The storage 12 stores therein the information set by the welding condition setter 13, and various parameters, such as the wire feeding speed WF (see FIG. 2) of feeding the welding wire 18, the feeding rate of the wire, and the inductance values of the reactor for the electronic reactor control for different wire feeding speeds WF. The feeding rate of the welding wire 18 is determined in proportion to the set current set by the operator.

The arc welding apparatus 100 further includes an arc controller 11. The arc controller 11 is configured to output, based on outputs from the welding current detector 8, the welding voltage detector 9, the constriction detector 10, and the storage 12, a signal for controlling a current and a voltage for generating an arc. The driver 7 is configured to controls the switch 3 on the basis of an output of the arc controller 11. Although not illustrated, the arc controller 11 includes a short-circuit detector configured to detect and determine a short-circuit between the droplet 21 at the tip of the welding wire 18 and a base material 17, on the basis of the output of the welding voltage detector 9. The short-circuit detector may be provided outside the arc controller 11.

The welding wire 18 is fed by a feeding motor controlled by a wire feeder 19. The welding is performed by supplying electric power for welding to the welding wire 18 via a chip 15 provided on the torch 14, and generating an arc 20 between the welding wire 18 and the base material 17.

The components constituting the arc welding apparatus 100 illustrated in FIG. 1 may be components constituted solely or may be components constituted by combining two or more of them.

[Welding Output Control in Arc Welding]

Figure 2:
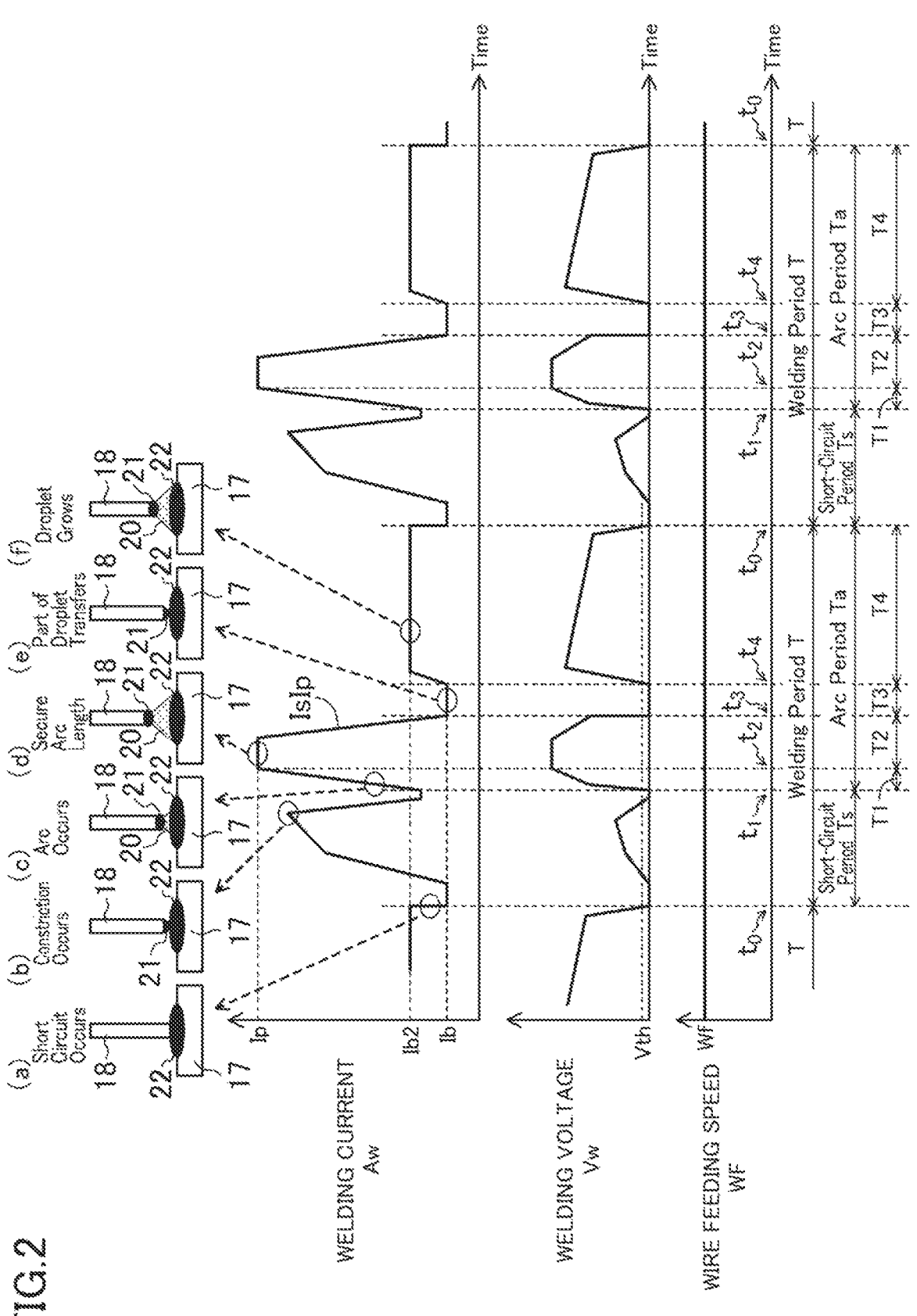
FIG. 2 is a time chart showing the output waveforms of a welding current and a welding voltage, a wire feeding speed, and states of transfer of a droplet in welding.

FIG. 2 illustrates output waveforms of the welding current and the welding voltage, a wire feeding speed, and the states of transfer of a droplet in welding according to this embodiment.

In the arc welding illustrated in this embodiment, the welding voltage Vw and the welding current Aw, which are welding outputs, are controlled based on a set voltage and a set current, which are set in advance before the welding operation.

In this embodiment, the welding wire 18 has a wire size of 1.2 mm, for example. Here, the base material 17 is a steel plate made of iron and has a thickness of 4.5 mm, for example, so that the base material is a so-called "medium thickness." The shielding gas to be sprayed to the base material 17 is a gas containing carbon dioxide gas. Here, the "gas containing carbon dioxide gas" refers to a gas containing carbon dioxide gas by not less than 10% but not more than 30%, or preferably 20%. Note that the gas contains an inert gas, typically an argon gas, as a component other than the carbon dioxide gas.

The arc welding described in this embodiment is performed in such a way that one cycle is a cycle of a welding period T, which is the sum of a short-circuit period Ts and an arc period Ta following the short-circuit period Ts. By continuously repeating the welding period T, in other words, by alternating the short-circuit period Ts and the arc period Ta, DC arc welding is performed on the base material 17. The welding wire 18 is fed forward to the base material 17 at a constant feeding speed Wf based on the set current throughout the welding period T, in other words, throughout the short-circuit period Ts and the arc period Ta. In this embodiment, the feeding speed Wf is within a range from about 7 m/min to about 8 m/min. Note that DC arc welding includes straight-polarity welding and reverse-polarity welding. In the reverse-polarity welding, the negative side is connected to the base material 17 and the positive side is connected to the welding wire 18 serving as an electrode via the chip 15. In the straight-polarity welding, the negative side is connected to the welding wire 18 serving as an electrode via the chip 15 and the positive side is connected to the base material 17. The welding described in this specification is reverse-polarity welding.

When the welding voltage Vw detected by the welding voltage detector 9 becomes lower than or equal to a threshold voltage Vth, it is determined that a short-circuit occurs between the welding wire 18 and the base material 17. In other words, a short-circuit is detected. From this time point t0, the short-circuit period Ts starts (FIG. 2 (a)), and the droplet 21 at the tip of the welding wire 18 and the base material 17 come into contact with each other to continue the short-circuit state. In the short-circuit period Ts, the welding output is under current control. In the short-circuit period Ts, the output is performed based on a waveform pattern of the welding current Aw, which has been experimentally determined in advance. More specifically, the waveform pattern of the welding current Aw in the short-circuit period Ts includes a constantly-held value of the welding current Aw output after the detection of the short-circuit and a predetermined holding time for the constantly-held welding current Aw, a rising gradient of a first rising slope after the predetermined holding time (predetermined period), a value of the welding current at an inflection point, and a rising gradient of a second rising slope. The welding current Aw with this waveform pattern is output in accordance with the feeding speed WF of feeding the welding wire 18.

The threshold voltage Vth is preferably set to a low voltage of several volts to tens of volts and is set to 10 V in this embodiment. However, the threshold voltage Vth is not particularly limited thereto and may be a voltage of another value as appropriate, for example, not less than 7 V but not more than 12 V.

After the lapse of the predetermined period from the time point t0, the welding current Aw is raised at the rising gradients of the first and second rising slopes to burn the welding wire 18, thereby facilitating the opening of the short-circuit between the base material 17 and the welding wire 18. With a further rise in the welding current Aw, the droplet 21 at the tip of the welding wire 18 starts constricting due to an electromagnetic pinching force. Accordingly, the amount of the welding voltage detected by the welding voltage detector 9 starts changing over time. At the time point when the constriction detector 10 detects this change (constriction) (FIG. 2 (b)) based on the output of the welding voltage detector 9, the arc controller 11 lowers the welding current Aw.

A time point t1 is a time point at which the opening of the short-circuit is detected as a result of completion of the transfer of the constricted droplet 21 from the tip of the welding wire 18 to the base material 17. At this time point, the short-circuit state ends and an arc state is generated from the time point t1, starting the arc period Ta. Like the case of the start of the short-circuit, the opening of the short-circuit is determined once the welding voltage Vw exceeds the threshold voltage Vth.

Here, the threshold voltage for determining a short-circuit between the welding wire 18 and the base material 17 and the threshold voltage for determining the opening of the short-circuit at the time point t1 are set to the same threshold voltage Vth just for the sake of simple explanation.

However, for the sake of more stable detection, the threshold voltage for determining the opening of the short-circuit at the time point t1 may be set to be a threshold voltage Vth' higher than the threshold voltage for determining a short-circuit between the welding wire 18 and the base material 17.

By raising the welding current Aw from the time point t1 to a time point t2, an arc 20 is generated between the welding wire 18 and the base material 17 (FIG. 2 (c)), and the arc length increases. The period from the time point t1 to the time point t2 will be referred to as a "first period T1". In the first period T1, the welding output is under constant current control.

Once the welding current Aw reaches a first current value Ip at the time point t2, the arc controller 11 switches the control mode of the welding output to constant voltage control. Specifically, the welding output is controlled so that the moving average of the welding voltage Vw is a set voltage.

Once the welding current Aw reaches the first current value Ip, a predetermined arc length is secured (FIG. 2 (d)). Next, once the welding voltage detector 9 detects the start of the lowering the welding voltage Vw, the arc controller 11 lowers the welding current Aw from the first current value Ip to a second current value Ib with a time slope Islp. Here, the time slope Islp represents the degree of a change in the welding current Aw over time and is a negative value as clear from FIG. 2. However, in this specification, the time slope Islp will be described using an absolute value.

The period from the time point t2 to a time point t3 at which the welding current Aw lowers to the second current value Ib will be referred to as a "second period T2". As described above, in the second period T2, the welding output is under constant voltage control. The arc controller 11 performs the constant voltage control of the welding output by changing the sum of the inductance values of the reactor 6 and an electronic reactor under electronic reactor control, specifically, by selecting an appropriate one of the inductance values of the electronic reactor stored in the storage 12.

In this embodiment, the first current value Ip is 470 A, but the first current value Ip is not particularly limited thereto, and may be another value as appropriate, for example, not less than 400 A but not more than 500 A. The second current value Ib is 150 A, but the second current value Ib is not particularly limited thereto, and may be another value as appropriate, for example, not less than 100 A but not more than 200 A. The time slope Islp is 600 A/msec, but the time slope Islp is not particularly limited thereto, and may be another value as appropriate, for example, not less than 300 A/msec but not more than 700 A/msec.

If the welding current detector 8 detects that the welding current Aw reaches the second current value Ib, then, at the time point t3 when this occurs, the arc controller 11 switches the control mode of the welding output again to the constant current control. The constant current control is performed until a time point t4, so as to keep the welding current Aw at the second current value Ib. The period from the time point t3 to the time point t4 will be referred to as a "third period t3". In order to reduce an excessive growth of the droplets 21, which would cause the detaching of the droplets 21 at unintended irregular timings, a part of the droplet 21 formed at the tip of the welding wire 18 is brought into contact with a molten pool 22 of the base material 17 at a certain timing within the third period T3. In this way, the part of the droplets 21 is absorbed into the molten pool 22, lest that the droplet 21 become excessively large (FIG. 2 (e)). That is, the third period T3 is also a short-circuit period in which the welding wire 18 and the base material 17 are short-circuited.

In this embodiment, the third period T3 is set to 1 msec, but the third period T3 is not particularly limited thereto, and may be another value as appropriate, for example, a value not less than 0.3 msec but not more than 3 msec.

The third period T3 is set to one third or less of the short-circuit period Ts. In this case, it is preferable that the third period T3 be not shorter than 1 msec but not longer than 2 msec and the short-circuit period Ts be not shorter than 2 msec but not longer than 6 msec. The arc controller 11 controls the welding output in such a way that, from the time point t4, the welding current Aw is increased from the second current value Ib to a third current value Ib2 and the welding current Aw is kept at the third current value Ib2 until the time point t0 of the next welding period T. The period from the time point t4 to the time point t0 of the next welding period T will be referred to as a "fourth period T4". In the fourth period T4, the welding output is under constant current control. In the fourth period T4, the droplet 21 is regrown at the tip of the welding wire 18 in such an extent that the detaching of the droplet 21 at an unintended irregular timing due to excessive growth of the droplet 21 would not occur before the timing of short-circuiting between the welding wire 18 and the base material 17 in the short-circuit period Ts, in other words, the detaching of the droplet 21 at an unintended irregular timing would not occur before the timing of short-circuiting between the welding wire 18 and the base material 17 in the short-circuit period Ts. The droplet 21 is transferred to the base material 17 by short-cutting transfer in the short-circuit period Ts of the next welding period T.

In this embodiment, the third current value Ib2 is 180 A, but the third current value Ib2 is not particularly limited thereto, and may be another value as appropriate, for example, a value not less than 100 A but not more than 200 A. However, the third current value Ib2 is set higher than the second current value Ib.

[Advantages]

As described above, the direct current (DC) arc welding control method according to this embodiment is a method of welding by alternating a short-circuit period Ts and an arc period Ta. The arc period Ta includes at least a first period T1, a second period T2, a third period T3, and a fourth period T4.

The arc welding control method includes: raising a welding current Aw flowing through a welding wire 18 to a first current value Ip in the first period T1; and lowering the welding current Aw from the first current value Ip to a second current value Ib with a time slope Islp in the second period T2. The method further includes at least: keeping the welding current Aw at the second current value Ib in the third period T3; and raising the welding current Aw from the second current value Ib to a third current value Ib2 in the fourth period T4, the third current value Ib2 being lower than the first current value Ip and higher than the second current value Ib, and then keeping the welding current Aw at the third current value Ib2 until at an end of the fourth period T4.

A wire feeding speed WF of feeding the welding wire 18 is constant (=Wf) throughout the short-circuit period Ts and the arc period Ta.

In the second period T2, the welding out is under the constant voltage control. At least in the third period T3 and the fourth period T4 within the welding period T other than the second period T2, the welding output is under the constant current control.

In the short-circuit period Ts, short-circuiting between the welding wire 18 and a base material 17 is carried out, so that a droplet 21 at a tip of the welding wire 18 is transferred to the base material 17 by the short-cutting transfer. In the first period T1, an arc 20 is generated between the welding wire 18 and the base material 17. In the second period T2, the arc 20 is caused to have an arc length of a predetermined value, and a droplet 21 is formed at the tip of the welding wire 18. In the third period T3, a part of the welding wire 18 is brought into contact with a molten pool 22 formed in the base material 17, so that the part of the droplet 21 is absorbed into the molten pool 22. In the fourth period T4, the arc 20 generated between the welding wire 18 and the base material 17 is maintained, and accordingly the droplet 21 is grown at the tip of the welding wire 18.

In this embodiment, the welding current Aw is lowered from the first current value Ip to the second current value Ib with the steep time slope Islp. In the third period T3, the welding current Aw is kept at the second current value Ib to bring a part of the droplet 21 into contact with the molten pool 22 so as to cause absorption of the part of the droplet 21 into the molten pool 22. In the fourth period T4, the welding current Aw is kept at the third current value Ib2 that is lower than the first current value Ip and higher than the second current value Ib. This facilitates preventing the droplet 21 from growing excessively large before the timing of short-circuiting between the welding wire 18 and the base material 17 in the short-circuit period Ts, thereby hindering the detaching of the droplet 21 at an unintended irregular timing. This also reduces the detaching of the excessively grown droplet 21, which would cause scattering of large spatters.

Moreover, with the configuration that the welding current Aw is increased to the first current value Ip and subsequently the welding current Aw is rapidly lowered from the first current value Ip to the second current value Ib in the second period T2, a large difference can be made between heat input to the welding wire 18 and heat input to the base material 17. This makes it possible to hold the detaching of the droplets 21 in the second period T2 and surely trigger the third period T3, thereby stabilizing the short-circuit cycle, and eventually the periodicity of the arc period Ta and the welding period T. The stable periodicity of the welding period T ensures that the base material 17 is welded stably at a high speed.

In the fourth period T4, the welding current Aw is kept at the third current value Ib2 in such a way that the detaching of the droplet 21 at an unintended irregular timing is prevented, while regrowing the droplet 21, thereby ensuring that the droplet 21 thus regrown will be transferred to the base material 17 at the next short-circuit period Ts, thereby keeping the periodicity of the detaching of the droplets 21. In addition, the molten pool 22 is less vibrated, which reduces the occurrence of a minute short-circuit and the scattering of spatters in the fourth period T4.

The constant voltage control of the welding output in the second period T2 of the arc period Ta secures the stability of the arc 20 against a disturbance, such as shaking of the hand, and reduces the occurrence of arc breakage or other problems.

On the other hand, in the other periods than the second period T2 within the arc period Ta, particularly in the third period T3 and the fourth period T4, the welding output is under constant current control. Accordingly, this configuration makes it possible to keep the welding current Aw at the second current value Ib and the third current value Ib2 in the respective periods stably.

For example, if the welding output is under constant voltage control in the third period T3, this would result in instability of the second current value Ib, which is varied greatly. If the second current value Ib becomes excessively higher than the set value, this would cause the whole droplet 21 to transfer to the base material 17, thereby disrupting the periodicity of the detaching of the droplets 21, which would impair the appearance of the welding points, or cause welding defects. If the second current value Ib becomes excessively lower than the set value, this would cause the welding wire 18 to thrust into the base material 17, which would cause welding defects.

Similarly, if the welding output is under constant voltage control in the fourth period T4, this would result in insta-bility of the third current value Ib2, which is varied greatly. If the third current value Ib2 becomes excessively higher than the set value, this would result in overgrowth of the droplet 21, thereby disrupting the periodicity of the detach-ing of the droplets 21, which would impair the appearance of the welding point, or cause welding defects. If the third current value Ib2 becomes excessively lower than the set value, this would result in failure of keeping the arc 20, which would cause arc breakage and welding defects.

According to this embodiment, the control of the welding output is switched over appropriately in the arc period Ta, thereby facilitating reduction of unfavorable situations as described above and facilitating stable arc welding.

In this embodiment, the wire feeding speed WF of feeding the welding wire 18 is constant throughout the short-circuit period Ts and the arc period Ta.

This configuration eliminates the need of providing the wire feeder 19 with the function needed for controlling the wire feeding speed WF variably. Since the welding wire 18 is fed only in one direction, that is, only forward in this case, the feeding motor controlled by the wire feeder 19 may have a simpler structure. These features make it possible to simplify the arc welding apparatus 100 and reduce the costs for the apparatus.

The first current value Ip is preferably not less than 400 A but not more than 500 A.

More preferably, the first current value Ip is 470 A.

If the first current value Ip is lower than 400 A, this would result in instability of the arc length, which would cause minute short-circuits, and scattering of spatters. On the other hand, if the first current value Ip is higher than 500 A, this would promote the growth of the droplet 21 in the second period T2, so that the detaching of the droplet 21 occurs at an unintended earlier timing, thereby causing the scattering of the droplet 21 as large spatters, and an unstable short-circuit cycle.

The time slope Islp is preferably not less than 300 A/msec but not more than 700 A/msec. More preferably, the time slope Islp is 600 A/msec.

If the time slope Islp is smaller than 300 A/msec, this would cause excessive heat input, which would cause the detaching of the droplet 21 before the short-circuiting in the third period T3. On the other hand, if the time slope Islp is larger than 700 A/msec, this would cause such a short-circuit of the droplet 21 that the droplet 21 short-circuits with the base material 17 at a high current value when lowering the welding current Aw, which would cause the scattering of the droplet 21 as spatters.

The second current value Ib is preferably not less than 100 A but not more than 200 A. More preferably, the second current value Ib is 150 A.

If the second current value Ib is lower than 100 A, this would cause an unstable arc 20 due to insufficient heat input. On the other hand, if the second current value Ib is higher than 200 A, this would cause an excessive absorption of the droplet 21 to the base material 17 in the third period T3, which would cause the scattering of the droplet 21 as spatters.

The third current value Ib2 is preferably not less than 100 A but not more than 200 A. More preferably, the third current value Ib2 is 150 A.

If the third current value Ib2 is lower than 100 A, this would cause insufficient melting at the tip of the welding wire 18 and an unstable arc 20. On the other hand, since a third current value Ib2 higher than 200 A vibrates the molten pool 22 largely in the fourth period T4, such a high third current value Ib2 would cause a minute short-circuit, which would cause the scattering of spatters.

The third period T3 is preferably not shorter than 0.1 msec but not longer than 3 msec. More preferably, the third period T3 is 0.3 msec.

If the third period T3 is shorter than 0.1 msec, this would result in that the current value flowing the welding wire 18 when the welding wire 18 comes into contact with the molten pool 22 would become various, which would cause an unstable periodicity of the third period T3. On the other hand, if the third period T3 is longer than 3 msec, this would also cause an unstable periodicity of the third period T3 due to insufficient heat input.

The third period T3 is preferably one third or less of the short-circuit period Ts.

This time length of the third period T3 facilitates the stability of the periodicity of the arc period Ta. This configuration facilitates stable formation of weld beads (not shown) with more uniform bead edges on the base material 17 and reduction of spattering in welding.

The third period T3 is preferably not shorter than 1 msec but not longer than 2 msec and the short-circuit period Ts is preferably not shorter than 2 msec but not longer than 6 msec.

It is preferable that the short-circuit between the welding wire 18 and the base material 17 be determined based on whether the welding voltage Vw becomes lower than or equal to the threshold voltage Vth.

This configuration would facilitate sure determination of a short-circuit between the welding wire 18 and the base material 17.

The threshold voltage Vth is preferably not less than 7 V but not more than 12 V. More preferably, the threshold voltage Vth is 10 V.

It is preferable that the shielding gas sprayed to the base material 17 in welding be a mixed gas of an inert gas and carbon dioxide gas.

As described above, the use of such a mixed gas as the shielding gas would cause overgrowth of the droplet 21 due to the detachability of the droplet 21 at the tip of the welding wire 18 improved by the use of the mixed gas, in other words, due to excessive improvement of the detachability by the use of the mixed gas. This increases the overall size of the droplet 21 at the tip of the welding wire 18 at the time of welding a base material with a medium thickness, for example. With a larger size, the droplet 21 more likely are detached from the welding wire 18 at an irregular timing, which disrupts the periodicity of the timings of removal. Accordingly, the arc becomes unstable and a minute short-circuit would tend to occur between the welding wire and the base material.

On the other hand, according to this embodiment, in which the welding current Aw and the welding voltage Vw, which are welding outputs, are controlled as described above, it become possible to stabilize the timings of detaching of the droplets 21, thereby facilitating the periodicity of the arc period Ta and reduction of the occurrence of spatters.

OTHER EMBODIMENTS

This embodiment describes an example in which the arc welding apparatus 100 is a semi-automatic welding apparatus, but it should be clearly understood that the DC arc welding control method according to the present disclosure is a technique also useful for high-speed welding using a robot.

The DC arc welding control method according to the present disclosure is useful because this method can stabilize the timings of detaching of droplets, thereby facilitating reductions of spattering.

The invention claimed is:

1. A DC arc welding control method of welding by alternating a short-circuit period and an arc period, wherein
    the arc period includes at least a first period, a second period, a third period, and a fourth period,
    the DC arc welding control method comprises at least:
        in the first period, raising a welding current flowing through a welding wire to a first current value;
        in the second period, lowering the welding current from the first current value to a second current value with a predetermined time slope;
        in the third period, keeping the welding current at the second current value; and
        in the fourth period, raising the welding current from the second current value to a third current value lower than the first current value but higher than the second current value, and then keeping the welding current at the third current value until the fourth period ends;
    the welding wire is fed at a feeding speed constant throughout the short-circuit period and the arc period,
    in the second period, a welding output is under constant voltage control, and
    at least in the third period and the fourth period, the welding output is under constant current control.

2. The DC arc welding control method of claim 1, comprising:
    in the short-circuit period, short-circuiting between the welding wire and a base material so as to perform short-circuiting transfer of a droplet at a tip of the welding wire to the base material;
    in the first period, generating an arc between the welding wire and the base material;
    in the second period, causing the arc to have an arc length of a predetermined value, and forming a droplet at the tip of the welding wire;
    in the third period, bringing the welding wire into contact with a molten pool formed in the base material, and causing a part of the droplet to be absorbed in the molten pool; and
    in the fourth period, keeping the arc generated between the welding wire and the base material, and growing the droplet at the tip of the welding wire.

3. The DC arc welding control method of claim 1, wherein the first current value is not less than 400 A but not more than 500 A.

4. The DC arc welding control method of claim 1, wherein the time slope is not less than 300 A/msec but not more than 700 A/msec.

5. The DC arc welding control method of claim 1, wherein the second current value is not less than 100 A but not more than 200 A.

6. The DC arc welding control method of claim 1, wherein the third current value is not less than 100 A but not more than 200 A.

7. The DC arc welding control method of claim 1, wherein the third period is not shorter than 0.1 msec but not longer than 3 msec.

8. The DC arc welding control method of claim 1, wherein the third period is one third or less of the short-circuit period.

9. The DC arc welding control method of claim 8, wherein the third period is not shorter than 1 msec but not longer than 2 msec, and the short-circuit period is not shorter than 2 msec but not longer than 6 msec.

10. The DC arc welding control method of claim 1, wherein a shielding gas sprayed to the base material in welding is a mixed gas of an inert gas and carbon dioxide gas.

\* \* \* \* \*